April 25, 1967  R. P. FLETCHER, JR., ETAL  3,316,521
VARIABLE TERMINATION STRIP CONNECTOR
Filed Feb. 12, 1964  2 Sheets-Sheet 1
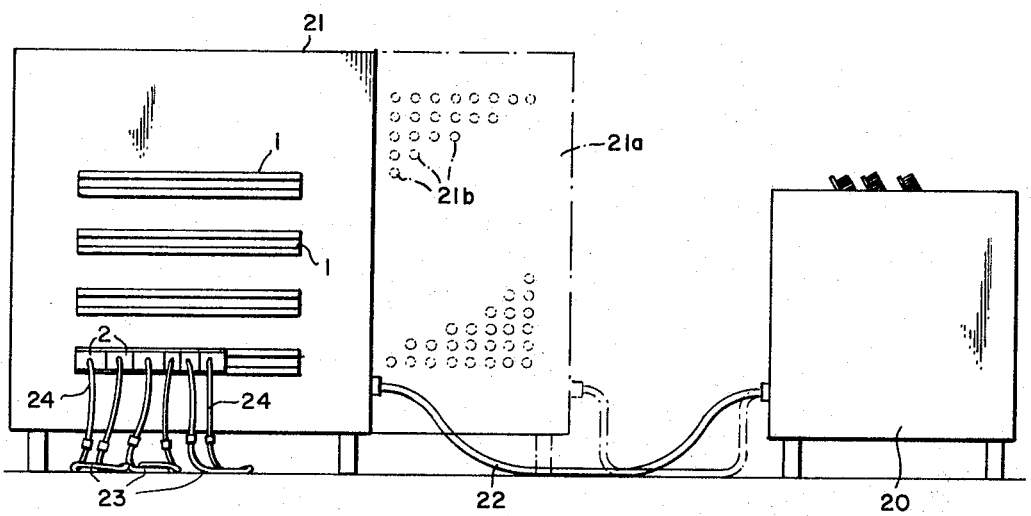
FIG. 1
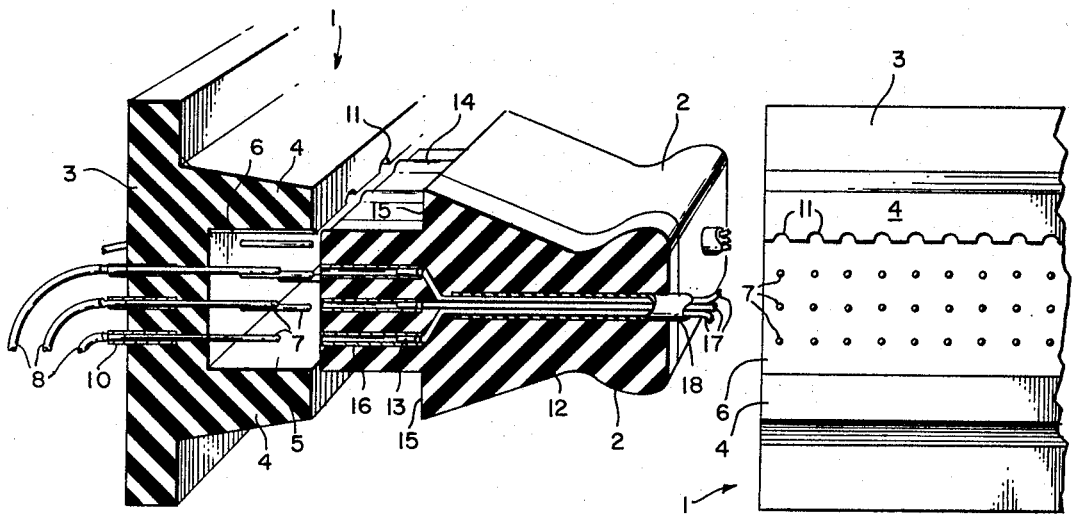
FIG. 2
FIG. 3
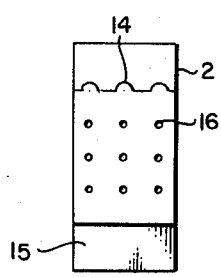
FIG. 4
RALPH P. FLETCHER JR.
CHARLIE T. PERKINS
INVENTORS
BY *Seed & Berry*
ATTORNEYS April 25, 1967  R. P. FLETCHER, JR., ET AL  3,316,521
VARIABLE TERMINATION STRIP CONNECTOR
Filed Feb. 12, 1964  2 Sheets-Sheet 2
FIG___5
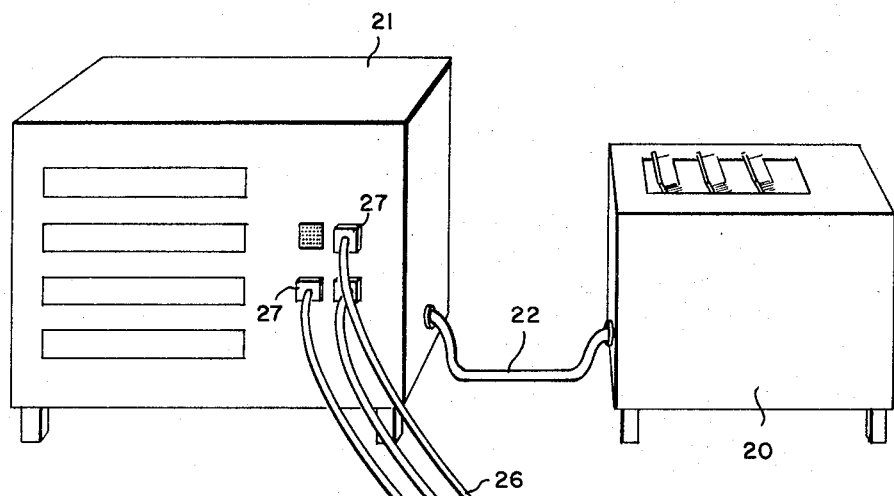
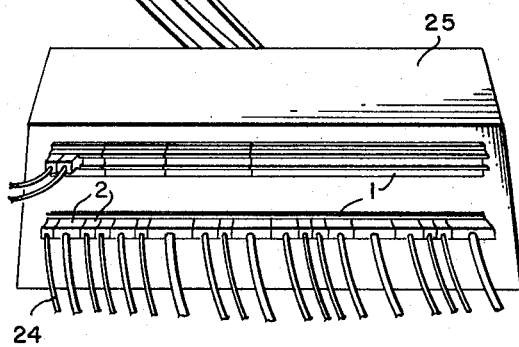
FIG___6
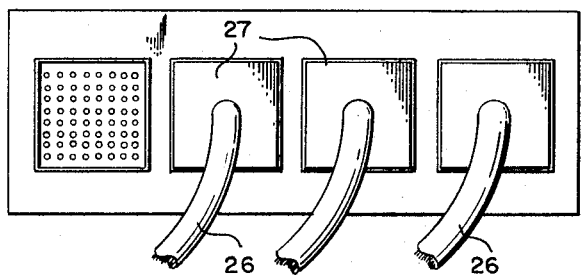
RALPH P. FLETCHER JR.
CHARLIE T. PERKINS
INVENTORS
BY *Seed Berry*
ATTORNEYS United States Patent Office 3,316,521
Patented Apr. 25, 1967

3,316,521
VARIABLE TERMINATION STRIP CONNECTOR
Ralph P. Fletcher, Jr., 315 169th Place SW., Bothell, Wash. 98011, and Charlie T. Perkins, 1430 SW. 148th, Seattle, Wash. 98106
Filed Feb. 12, 1964, Ser. No. 344,280
2 Claims. (Cl. 339—21)

The present invention relates in general to multiple lead electrical connectors and more specifically to a versatile multiple lead connector wherein a number or sequence of numbers of the total number of leads to the connector receptacle may be utilized by one or a combination of individual mating plug elements having the corresponding number of electrical leads. The invention relates also to a system of electrical wire connections which allows pin-to-pin connecting of the individual wires of multiple cables or bundles to a testing device or other electrical unit, simultaneously and without the use of separate connector sockets for the various cables or bundles. As used throughout the specification the term "pin-to-pin connection" is used in the broad sense to mean merely direct terminal connecting of individual electrical wires without regard to any special arrangement of wires.

In industries where complex electrical systems are manufactured or used serious problems arise in providing pin-to-pin connections between bundles of wires or multiple-lead-wire components and units such as switch panels, electrical circuit analyzers, circuit testing machines, etc. The problem is especially acute where there is a space limitation and where particular wire bundles or electrical components have to be connected to specific receptacles. The aircraft industry is one outstanding example of the situation and therefore will be referred to in this specification to illustrate the system of pin-to-pin connections according to the present invention. It will be understood, however, that the pin-to-pin connector system of the present invention is not limited to any specific testing device, circuit analyzer, switching system, or disconnector system.

In the production and maintenance of modern aircraft, the maze of wires in the various electrical systems must be checked by machine testing of the wire bundles and circuits. In the past, this testing has been done at great expense and loss of time because each individual electrical component or bundle of wires to be tested had to be provided with a unique adapter cable and electrical connector between the adapter cable and the circuit analyzer. The electrical connectors used in the past have varied greatly in size and number of pin connections and hence the circuit analyzer or testing unit had to be provided with an extremely large bank of individual plug-in receptacles for receiving the various types and sizes of adapter cables. For instance, an adapter cable for a bundle of 30 wires would have a connector element with 30 pins which would only fit a certain receptacle on a huge bank of receptacles on the tester or analyzer unit. The adapter cable could not be accommodated by anything less than a 30 pin receptacle and if a receptacle having more than 30 pins were utilized, the excess pins of the receptacle would be lost or wasted. Most circuit analyzers or testers of the nature referred to are controlled by means of card readers which utilize information stored on punched cards or the like to program the tester to set up the proper test for any given combination of receptacles used. Thus every one of the individual receptacles has to be identified and this information converted to the card reader control unit in order to run a test.

According to the present invention, essentially only one receptacle need be provided on any given switching panel, circuit tester, or circuit analyzer, with the receptacle having any number of pins in multiple rows in linear arrangement, with the pins in the rows being equidistant. Each pin of the receptacle is adapted to be used in a circuit of the device when so programmed by the card reader control unit or the like. The receptacle of the present invention is in strip or elongated form and may be an integral member or a composite structure made up of several individual strips in abutting relation as will presently be described in detail. The ability to utilize a combination of abutting strip receptacles without loss of space or the loss of any terminals provides flexibility hitherto unattained in the art. Each plug of each adapter cable is then provided with a number of pins having the same spacing and arranged in the same number of rows as used in the receptacle, the plugs varying only in the number of pins provided. Thus a 30 wire bundle would be provided with an adapter cable having a plug with 30 pins so arranged as to mate with any given 30 adjacent pins in the receptacle. A 15 pin plug or a 15 wire bundle would have its 15 pins in the same spacial relationship and would be just half as big as the 30 pin plug. These plugs could then be placed at any location on the multiple pin receptacle. In utilizing this receptacle and plug arrangement for connecting several bundles or components simultaneously, the plugs are inserted in the receptacle starting at one end of the receptacle and then placed in abutting relationship and in a given sequence. It is then unnecessary to have to identify individual receptacles and to feed the information into the card reader control device but, instead, only the sequence of placement of the plugs is necessary to be converted to the card reader, greatly simplifying the programming of any test series or switching function.

It is also possible to construct a much simpler receptacle device and tester or switching unit since fewer pins on the receptacle are necessary because no pins are wasted with the abutting plug relationship, and any given plug will mate with any given segment of the receptacle. Much time and effort is also saved since the person setting up the system does not have to search for a particular receptacle from a huge bank of receptacles in making the hook-up and, with the plugs in the abutting relationship and linear arrangement, the inconvenience of tangled cables and wire bundles is avoided.

One of the objects of the present invention is, therefore, to reduce the number and simplify the placement of lead wires for electrical units such as circuit analyzers, testing devices and the like.

Another object of the present invention is to provide an electrical connector configuration for obtaining the maximum utility from the circuits of an electrical unit.

Another object of the present invention is to provide a connector unit, the elements of which have no specific mating position but may be mated at any desired position in linear arrangement.

A further object of the present invention is to provide an electrical connector device having a receptacle with multiple rows of connector pins equidistantly spaced and capable of receiving multiple connector plugs having connector pins in identical placement allowing for the placement of any given plug at any given location along the receptacle.

A further object of the present invention is to provide an electrical connector receptacle capable of receiving varying sizes of connector plugs with varying numbers of connector pins.

A still further object of the present invention is to provide an electrical connector in strip form which may be expanded indefinitely as to the number of pin connections.

Means by which the foregoing objects and other advantages of the present invention are accomplished are set forth in the following specification and claims and are illustrated in the accompanying drawings in which:

FIG. 1 is an elevational view of a card reader control unit and a circuit analyzer equipped with a strip connector device of the present invention;

FIG. 2 is a perspective view of the strip connector device illustrating certain details;

FIG. 3 is a plan view of the receptacle portion of the connector with the plugs removed;

FIG. 4 is a plan view of the plug element of the strip connector;

FIG. 5 is a perspective view showing a typical hook-up utilizing a portable strip connector arrangement; and FIG. 6 is a back elevation of the portable unit shown in FIG. 5.

Referring now to the drawings, wherein like reference numerals are used to indicate identical parts in the various views, and referring first of all to FIGS. 2, 3 and 4, the connector device per se, in the preferred form, comprises a receptacle indicated generally at 1 and individual plug members 2. The receptacle 1 may be molded or otherwise constructed from any insulating material such as plastic, resin, or rubber composition and includes a base portion 3 and spaced walls or ribs 4 forming a rectangular cross section recess having sides 5 and bottom 6.

A plurality of pin connectors 7 are molded or otherwise secured in the body of the base portion 3 of the receptacle and extend therethrough and protrude from the bottom 6 of the recess a short distance. Each of the pins 7 is connected to a corresponding electrical lead wire 8 which may be attached to the pins by soldering or by the sleeve 10 surrounding the pins or by any other well known method. As illustrated in FIG. 2, the pins 7 have been arranged in three horizontal rows with the rows of pins and the individual pins in each row being spaced equidistantly. Although only three rows of pins are illustrated in the drawings, it will be understood that more or less rows may be utilized as desired without departing from the scope of the invention. It will also be noted that the distance between the end pins 7 and the end of the receptacle unit is only one half the distance between the remaining pins. Although only one end of a receptacle unit is shown in FIG. 3, it will be understood that both ends are identical. This structure allows the units to be placed in abutment in such a manner that the distance between the end pins on adjacent units is the same as between the remaining pins. It is therefor possible to construct a composite receptacle unit while maintaining a uniform distance between pins throughout the length of the receptacle. To complete the structure of the receptacle, one of the walls 4 is provided with vertical indexing grooves 11 extending the full depth of the recess formed by the walls. An indexing groove is located in alignment with each vertical row of pins, as viewed in FIG. 2. The receptacle 1 may be extended indefinitely in the longitudinal direction depending upon the number of electrical leads 8 and pins 7 desired to be mounted.

The plug portion of the connector device may constitute any desired number of individual plug units 2 and since these units differ only in relative size, depending upon the number of pins to be connected, only one of these plug units will be described in detail. As in the case of the receptacle member, the plug units may be constructed from any dielectric or electrically non-conductive material as desired and will include a grip portion 12 of any desired configuration to facilitate removal of the plug from the receptacle. The plug-in portion 13 of the plug unit is identical in cross section with the recess between the walls 4 of the receptacle and includes indexing keys 14 for engaging the grooves 11 in the wall 4. The grip 12 of the plug unit is formed with shoulders 15 which engage the ends of the walls 4 when the plug unit is inserted in position within the receptacle.

Molded or otherwise formed within the body of the portion 13 of the plugs are a plurality of female electrical connector sleeves or contacts 16 adapted to receive the pins 7 when the parts are mated. The sleeves 16 are in turn soldered or otherwise connected to electrical leads 17 contained in an insulated layer or other covering 18 molded in the body of the grip portion 12. As seen in FIG. 4, the female connector sleeves 16 are arranged in rows and are spaced equidistantly in the same relationship as the pin connectors 7 of the receptacle, with the edges of the plug being spaced from the end pair only one half the distance between pins. As pointed out, the size of the plugs 2 may be varied as to the number of rows of connector sleeves 16 to correspond to the number of wires 17 to be connected with test wires 8. With this arrangement, it will also be noted that any given plug 2 may be placed at any selected position along the receptacle 1 and will mate with the receptacle in that position when the key 14 is aligned with one of the grooves 11. Also, as shown in FIG. 2, any number of individual plug units may be aligned in a given sequence and placed in abutting relation along the length of the receptacle 1. Thus, as few as desired, or all of the pins 7 of the receptacle may be utilized during any given test.

The pin-to-pin connector system of the present invention is illustrated in connection with an electrical circuit testing system by way of example in FIGS. 1, 5 and 6 of the drawings. The circuit testing system shown is generally known in the art as machine testing of electrical components or electrical systems. The normal components utilized include a circuit tester or analyzer, a card reader for programming the circuit analyzer according to the particular circuits or components being tested and adapter cables for connecting the items being tested to the circuit analyzer. The circuit analyzer is designed to receive a signal response from an electrical component or system and determine is readiness for operation or performance. The details of such components form no part of the present invention, and only known prior art components are contemplated for use with the present invention. The card reader device may likewise be a standard piece of equipment well known in the art capable of interpreting information stored on cards which relate to the particular test items and to control or program the circuit analyzer to perform given tests on the item.

In the prior art it has been necessary to also equip the circuit analyzer with a huge bank of receptacles of various sizes and types in order to obtain a pin-to-pin hook-up with the adapter cable connected to the item being tested. Thus a given adapter cable could only be hooked up through a designated receptacle of the circuit analyzer and to test a given system, which might involve a large number of adapter cable hook-ups, identification of the receptacles utilized must be converted to card form in order to successfully program the tester. In the present invention, a system of testing is made possible wherein the continuous strip connector previously described replaces a bank of receptacles on the circuit analyzer and particular adapter cables need only to be plugged into the receptacle according to a predetermined sequence but without regard to any particular location on the connector receptacle. For instance, any given test which might involve a plurality of adapter cable hook-ups, need only be conducted with the cable end plugs being inserted in a given sequence along the continuous strip connector. The only information then necessary to be fed through the card reader is the sequence of the adapter cable hook-ups.

FIG. 1 shows one arrangement of the testing system wherein the card reader control console 20 is electrically connected to a standard circuit analyzer 21 by means of the cable 22, the circuit analyzer 21 being equipped with connector receptacles 1 providing any desired number of connector pins for the various circuits of the analyzer. The items being tested in the illustration in FIG. 1 comprise production bundles of wires 23 having both ends equipped with adapter cables 24. The adapter cables 24 on the ends of the bundles 23 are provided with plug members 2 so that each wire of each bundle is provided with a pin-to-pin connection on each end with the analyzer. The analyzer 21 is then programmed by the card reader 20 using only the sequence in which the plugs 2 are arranged.

FIG. 1 also illustrates the comparison in overall size and complexity between the analyzer provided with the strip connector of the present invention and one utilizing a bank of receptacles according to known prior art. The dotted line portion 21a of FIG. 1 illustrates the additional panel area needed in order to mount individual receptacles such as indicated at 21b in order to obtain pin-to-pin connection between each adapter cable and the analyzer. As will be obvious to those skilled in the art, much time would be lost by locating the proper receptable 21b for any multiple hook-up test.

FIGS. 5 and 6 illustrate another adaptation of the testing system made possible by the use of the strip connector of the present invention. As shown in FIG. 5, the tester 21 is connected to the card reader 20 by the cable 22, as previously described, and a portable strip connector panel unit 25 is connected to the tester 21 by means of the extension cables 26. The unit 25 may be taken to any assembly location such as on board an aircraft or the like in situations where it is impractical to remove the equipment or wire bundles being tested. It will be understood, of course, that the unit 25 may be any given size so as to accommodate one or more of the extension cables 26 and that a plurality of such unit may be used with a single tester 21. The unit 25 serves to distribute the individual wires of each cable 26 over the receptacle portion of the strip connectors 1. Thus each extension cable 26 may comprise, for instance, one hundred individual wires from the testers 21 and thus the unit 25 in FIG. 5 enables a random access of 300 pin connections on the strip connectors 1. The various sizes of plugs 2 carried by the adapter cables 24 may then be located in sequence starting from the left end of the bottom strip connector 1 and placed in abutment so as to utilize all three hundred pin connections of the unit 25. In the prior art, it was virtually impossible to provide a portable receptacle panel due to the size of the receptacle panel. As shown in FIGS. 5 and 6, the extension cables 26 are equipped with multiple lead connectors 27 on each end providing a pin-to-pin connection of all of the wires of all of the cables 26 between the tester 21 and the portable unit 25.

It will be readily apparent to those skilled in the art that the present invention provides novel and useful improvements in electrical connectors in general and in pin-to-pin circuit connectors of the character described. The arrangement and types of structural components utilized within this invention may be subject to numerous modifications well within the purview of this invention and applicant intends only to be limited to a liberal interpretation of the specification and appended claims.

Having thus described the invention, what is claimed as new and desired to be secured by Letters Patent is:

1. An electrical connector comprising, a receptacle member and a plurality of mating plug members, said receptacle including an elongated base portion and spaced parallel ribs extending from one surface thereof to form an elongated recess, a plurality of connector pins in the body of said base and protruding into said recess perpendicular to the bottom thereof, said pins being uniformly spaced in a plurality of uniformly spaced rows running the length of said recess, a plurality of uniformly spaced indexing grooves in one of said ribs within said recess, each of said plug members including a grip portion and an elongated portion for reception within said recess, indexing ribs on the elongated portions for guiding said plug members into said recess, a plurality of connector sleeves within the body of each of said plugs having the same spacing as said pins, and means for connecting electrical wires to said pins and connector sleeves, whereby any one of said plugs may be inserted at random along the length of said receptacle for pin-to-pin connection between said lead wires.

2. The device according to claim 1 wherein a plurality of said receptacle members are placed in end-to-end abutment to form a continuous receptacle strip.

References Cited by the Examiner

UNITED STATES PATENTS

| | | | |
|---|---|---|---|
| 945,995 | 1/1910 | Weeks | 339—18 |
| 2,594,069 | 4/1952 | Poehlmann | 339—18 |
| 3,004,235 | 10/1961 | Cohen | 339—18 |
| 3,140,908 | 7/1964 | McCutcheon | 339—59 X |

FOREIGN PATENTS

| | | |
|---|---|---|
| 995,116 | 8/1951 | France. |
| 616,550 | 7/1935 | Germany. |
| 822,509 | 10/1959 | Great Britain. |
| 539,991 | 2/1956 | Italy. |

EDWARD C. ALLEN, *Primary Examiner.*

PATRICK A. CLIFFORD, *Examiner.*